United States Patent [19]

McClung et al.

[11] 4,075,265
[45] Feb. 21, 1978

[54] PROCESS FOR MAKING INSTANT SHAPED FOAMS

[75] Inventors: Charles E. McClung, Kettering; James L. Schwendeman; Ival O. Salyer, both of Dayton, all of Ohio

[73] Assignee: Monsanto Research Corporation, St. Louis, Mo.

[21] Appl. No.: 681,884

[22] Filed: Apr. 30, 1976

Related U.S. Application Data

[63] Continuation-in-part of Ser. No. 597,113, July 18, 1975, abandoned.

[51] Int. Cl.$^2$ ............................................. B29D 27/00
[52] U.S. Cl. ................................. 264/53; 264/177 R; 264/211; 264/DIG. 5; 264/DIG. 6; 264/DIG. 13
[58] Field of Search ................... 264/53, DIG. 8, 211, 264/DIG. 5, DIG. 6, DIG. 13, 177 R

[56] References Cited

U.S. PATENT DOCUMENTS

| | | | |
|---|---|---|---|
| 2,450,436 | 10/1948 | McIntire | 264/53 |
| 2,576,977 | 12/1951 | Stober | 264/53 X |
| 3,102,865 | 9/1963 | Sneary et al. | 264/53 X |
| 3,227,784 | 1/1966 | Blades et al. | 264/53 |
| 3,461,193 | 8/1969 | Gilardi | 264/53 |
| 3,523,916 | 8/1970 | Needham et al. | 264/211 X |
| 3,785,919 | 1/1974 | Hickman | 264/DIG. 8 |

OTHER PUBLICATIONS

Tordella, J.P. "Melt Fracture–Extrudate Roughness in Plastics Extrusion." In SPE Journal, Feb., 1956, pp. 36–40.

Bernhardt, Ernest C., Edt., "Processing of Thermoplastics Materials." New York, Reinhold, c1959, pp. 154–162 (SPE Plastics Engineering Series).

Salyer, I.O.; J. L. Schwendeman and C. E. McClung, "Evaluation of Four Foaming Techniques for Inflating a Pk.–2 Life Raft." In *Journal of Cellular Plastics*, Sept. 1968, pp. 345–356.

*Primary Examiner*—Philip Anderson
*Attorney, Agent, or Firm*—Bruce Stevens

[57] ABSTRACT

In a process for rapidly producing a substantially uniform, elongated, cellular thermoplastic article comprising rapidly discharging from a vessel a pressurized gel of a solid thermoplastic amorphous polymer and a gaseous solvent in an amount in the range of from about 25–100% by weight of said polymer, said solvent being capable of forming a flowable gel with the polymer when subjected to superatmospheric pressure, the improvement for shaping the article comprising restraining sufficiently the speed of flow of the gel from the vessel through a die to form the desired shaped article with the gel at ambient temperature in said vessel.

14 Claims, 4 Drawing Figures

PROCESS FOR MAKING INSTANT SHAPED FOAMS

This invention was made in the course of, or under, a contract with the Department of the Army.

CROSS REFERENCE TO RELATED APPLICATIONS

This application is an improvement of application Ser. No. 503,903, filed Sept. 6, 1974, issued May 25, 1976 as U.S. Pat. now Pat. No. 3,959,197 and is a continuation-in-part of copending application Ser. No. 597,113, filed July 18, 1975, now abandoned.

BACKGROUND OF THE INVENTION

This invention pertains to a process for the preparation of porous or cellular resinous articles.

A search was made of the patent art and no art anticipatory of the claimed invention of the present application was found. None of the processes described in the prior art involved instant foam type processes and none encountered the problem that was encountered and solved by applicants; however, the art found in the search is as follows:

U.S. Pat. No. 2,256,483 describes a process for producing synthetic spongy material, particularly from a polymer of ethylene. This process shown in the figure is carried out at elevated temperatures at which the polymer is molten, and a ribbon or sheet of spongy polymer is extruded through a die. It is stated on page 3, column 1, line 56-62, that further control of pore size in the sponge prepared by extrusion of a froth may be obtained by passing the molten froth through a screen prior to extrusion.

U.S. Pat. No. 3,232,709 describes a foam generating apparatus for generating and forming a plastic foam. In the second paragraph of the patent, it is stated that the materials, for example, may constitute a resin and a suitable prepolymer such as toluene diisocyanate which, upon contact with each other, will interact and expand to provide the desired foam. In column 4, lines 33-37, it is stated that the foam material will then continue out through the screening material 29 which aids in providing a more homogeneous consistency to the material which then passes from the outlet nozzle 28. The screen is also shown in the drawing. This screen serves to homogenously mix the reacting ingredients which form the solid form.

U.S. Pat. No. 3,286,992 is titled mixing device. The drawings show a device for mixing two fluids to form a foam. A polyurethane foam is described in column 5, lines 28-33, and screen packing of the nozzle is said to increase the uniformity of the cell size even further, with the screens being shown in FIG. 2.

U.S. Pat. No. 3,461,193 describes a novel procedure for starting the flash-extrusion of expandable resin compositions. In this patent, column 4, lines 27-33, is described a filter upstream of the orifices and the filter is ordinarily a screen-pack with mesh fine enough to prevent the passage of any particles capable of plugging the orifices but with open area very large with respect to orifice-area so as to prevent large relative pressure drops across filters.

U.S. Pat. No. 3,026,273 describes a process for making expandable vinyl aromatic resin compositions. The drawing shows a screw extruder and a screen or strainer is shown before the nozzle of the extruder, column 2, lines 33-37. The polymer is heated to melt it before extrusion as indicated in column 2, lines 57-59.

In the absence of the improvement of the present invention the instant foam process is an uncontrollable process as far as forming uniformly shaped articles. The speed of the foam through the die must be slowed down sufficiently to allow the die to shape the article. In the instant foam process a quick-opening ball value is used and a value of this nature must be used since a normal valve as a needle valve tears up the foam. In the prior art processes discussed above the screens or other restrictions are always used for mixing, filtering or controlling pore size or homogeneity of the foam, and in no case was a screen, perforated plate or other restriction used to control the shape of the foam article as in applicant's instant foam process. Also, it should be noted that a screen is not needed to control foam pore size in the instant foam process and that the shaping can be done by baffles, an elongated die, a tapered elongated die, equivalent restrictive means or combinations of these means with or without a screen.

The products of the present invention are useful for preparing energy management foams for air dropped loads, flotation devices, for packaging of delicate equipment, for emergency splints for personal injuries, for thermal insulation, for closing openings, for decorative purposes, etc. The foam is generally low-density with predominately closed-cell structure having high compressive strength and dimensional stability, with small uniform cells. Its whiteness makes it attractive for aesthetic reasons. However, it may be dyed readily, as by adding a soluble dye such as Congo Red or Brom Cresol Green in suitable concentration to the foamable mixture, e.g. 0.2–2.0% by weight of the solid foam.

SUMMARY OF THE INVENTION

An object of the invention is to produce a uniform low-density elongated cellular shaped structure from a styrene homopolymer or copolymer, vinyl chloride/vinyl acetate copolymers, and polyvinyl acetate. A further object is to provide a predominately closed-cell foam having high compressive strength and dimensional stability, and containing small uniform cells. Still a further object is to provide a white foam matrix to which organic and inorganic colorants can be added if desired.

These and other objects hereinafter defined are met by a process or method of producing a substantially uniform, solid, elongated, cellular thermoplastic, shaped article comprising rapidly discharging from a vessel a pressurized gel of a solid thermoplastic amorphous polymer and a gaseous solvent in an amount in the range of from about 25–100% by weight of said polymer, said solvent being capable of forming a flowable gel with the polymer when subjected to superatmospheric pressure, the improvement for shaping the article comprising restraining sufficiently the speed of flow of the gel from the vessel through a die to form the desired shaped article with the gel at ambient temperatures in said vessel. Foamable compositions usable in the process to make the cellular articles are described.

Ambient temperature means the temperature of the surrounding atmosphere be it indoors or outdoors. In all of the examples which follow, the gels in the vessels were at about normal room temperature, i.e. about 20° to 25° C.; however, experiments have been carried out at temperatures of −10° C. and below and at temperatures of 50° C and higher. At temperatures below about −10° C even with supplemental pressuring of the vessels with nitrogen or carbon dioxide, the discharge through the orifice is undesirably sluggish, and at temperatures above about 50° C the discharge through the orifice is so violent that control is difficult and the foam tends to shred. Thus, for the purposes of this invention ambient temperatures is restricted in definition to the temperature range of about −10° to 50° C.

In its narrower aspects, the compositions of the invention are as follows: The solution of the amorphous polymer has a solubility parameter (defined in J. Appl. Chem. 3, February 1953, page 73) between 8.4 and 10.4, and a molecular weight as measured by an intrinsic viscosity between 0.5 and 5 and preferably about 1; dissolved at 40 to 80% solids, preferably at 60 to 70% solids, in a solvent system consisting of a major amount of a low boiling solvent, preferably boiling below about 0° C, such as dimethyl ether butene-1, isobutene, butadiene-1,3, propylene and methyl chloride, and a minor portion of a solvent which boils above about 20° C such as Freon 11, Freon 21, chloroform, ethylene oxide or tetrachloroethylene; plus 0.5 to 25 parts, and preferably 5 to 10 parts of an nonionic or annionic surfactant; plus a nucleating agent such as glass microballoons, phenolic microballoons or micronized polyethylene.

The process itself consists of venting or depressurizing the polymer solution as described above through a straight-thru ball valve or similar non-constricting, quick-opening valve through flow restricting means and a die to form the shaped article.

The requirement for the polymer is that it shall be soluble, at high solids concentration, in a very low boiling solvent which are normally gases at room temperature, examples of which are methyl chloride and dimethyl ether.

To be soluble in these solvents, the polymer should have a solubility parameter between 8.4 and 10.4.

The polymer used must be of high molecular weight having an intrinsic viscosity value between 0.5 and 5.0 and preferably about 1.0.

The polymer must be amorphous in the sense that it cannot contain a significant quantity of a crystalline phase which prevents solubility at or near room temperature. Polyethylene, polypropylene, Nylon 6 or 66, and polyformaldehyde are examples of crystalline polymers not suitable for preparation of instant foams.

The polymers used for preparing instant foam must not contain high percentages of gel or be cross-linked during polymerization. Although butadiene/styrene copolymers are listed above as one of a group of polymers suitable for the practice of this invention, not all butadiene/styrene copolymers or polybutadienes are suitable. As is well-known in the rubber industry, many of the diene type polymers cross-link and develop gel content if taken to high conversion during polymerization. For many rubber applications this gel or crosslink material is not objectionable. However, for preparing instant foams, the polymer should preferably be completely soluble.

The range of solids contents of polymer which can be used in preparing instant foams, is limited to the range of 40 to 80% solids, and preferably about 60 to 70% solids. Forty percent is a minimum polymer content. Below this amount the foam shrinks. Solutions containing >80% polymer produce foams which do not shrink - but they are so viscous flow is inhibited.

As the major solvent we prefer either dimethyl ether or methyl chloride. These two solvents both have boiling points around −25° C and a vapor pressure of about 60 psig at room temperature. The low boiling point and the 60 psig vapor pressure at room temperature which is obtained with these two specific solvents are not matched by many other organic compounds. Additionally, these solvents have solubility parameters of around 9.3, and therefore will dissolve polymers having solubility parameters from 8.4 to about 10.4. All of the soluble non-crystalline, non-crosslinked organic polymers listed as suitable for this process do indeed have solubility parameters in this range.

Importantly, inert gases such as air, $N_2$, $CO_2$, and nitrous oxide, can be used as auxiliary pressurizing gases in order to extrude the higher density foam formulations at a faster rate, or at lower temperatures than would otherwise be possible.

In order to promote processability of instant foam, whether made of polystyrene or another polymer or copolymer, it is preferred to have a suitable co-solvent whose boiling point is preferably above about 20° C. The purpose of this second minor solvent is to promote processability by diffusing out of the polymer foam matrix into the gas space after the foam has been blown. Minor co-solvents of this type, which boil above 20° C include, but are not limited to, Freon 11, Freon 21, chloroform, ethylene oxide, tetrachloroethylene and diethyl ether. Certain hydrocarbons such as pentane and cyclopentane are valuable as minor co-solvents for low solubility parameter alkyl hydrocarbon type polymers such as polyisobutylene, butyl rubber, polybutadiene, and butadiene/-styrene copolymers.

In the absence of a suitable surfactant and/or water, the foam produced from an otherwise good formulation of polymer and solvents may be of very poor quality having large and uneven cells. Furthermore, the foam may not extrude well from a bottle or other container unless the container is specially coated with a slippery non-stick material such as Teflon. The surfactant and/or water has an equal or more important function of lubricating the container walls and discharge valves and pipes and thus facilitating flow of the viscous foam solution. A good surfactant is Igepal C0-970, a 100% nonyl phenol polyethylene oxide adduct. Another surfactant used is Triton X-200, an aqueous solution of a sodium salt of an aryl alkyl polyether sulfonate. Other cationic, anionic and nonionic surfactants with or without water are also suitable.

In addition to a suitable surfactant, a separate nucleating agent is desirable in order to obtain high quality solvent blown foam having a small and uniform cell size. In homogeneous polymer solutions, such as polystyrene, styrene acrylonitrile copolymers, or polyvinyl acetate, the use of a finely divided particulate nucleating agent such as glass microballoons, phenolic microballoons, or finely divided polyethylene is very beneficial to the production of smaller and more uniform celled foams than obtained with surfactant alone. Of the nucleating agents tested, the glass microballons appear to be the most generally useful. Other nucleating agent are also usable.

However, in non-homogeneous polymer systems, that in certain polyblend and graft copolymers, such as high impact polystyrene and ABS, the use of glass microballon or other nucleating agent is not necessary, and in some instances may be disadvantageous to obtaining small cell size uniform foams.

For extruding the instant foam solution to form product of uniformly small cell size, the design of the orifice and valve is critical. For example, a valve which is opened gradually will literally tear up the foam and disrupt its structure as it is flowing around the needle, gate, or seat of the valve. Preferably a straight-thru ball valve in which the opening is the same diameter as the orifice immediately prior to and after the valve is the most desirable arrangement. A gradual narrowing down from the pressure cylinder to the orifice is also highly desirable, such as a pressure cylinder whose neck, shoulder, and side wall have the general configuration of an "S" curve with gradual transition from straight to curved sections and a gradual transition between the curved surfaces.

The important considerations then are that there should be a smooth and gradual reduction from the diameter of the pressure cylinder to the configuration of the orifice. However, it is not ncessary that only round orifices be used. Square, triangular, or other shaped orifices or dies can also be used with the same limitations as already stated for the orifice and valve.

The pessurized container in which the final solution is packaged should preferably be fitted with either a dip tube or a bottom entry port in order to permit the use of separate extra pressurizing gases such as nitrogen and the others already listed. This modification to the pressurized dispensing cylinder is necessary or desirable only in order to obtain adequate rates of extrusion of the higher viscosity foam, solutions, or adequate rates of extrusion at low temperatures. The use of pressurizing gases also helps to prevent evaporation of the solvent/pneumatogen from the solution. This prevents changes in solution composition and evaporative cooling of the solution and consequent increases in viscosity.

Instant foams at about 2 to 10 lb/ft$^3$ density can be generated on-site and used as energy absorbing foams for air drop deceleration.

Instant foam can be extruded as a round or other shaped log of foam onto the surface of water, in order to form a floating dam, a bridge, or sections of foam for pontoons, life rafts, etc.

The instant foam can also be extruded as a thick sheet and laminated immediately after exit from the orifice with paper, cloth, foil, or polymeric films, on one side or both sides.

Instant foam being of high porosity is especially useful for absorbing oil, and a preferred type of instant foam for absorbing oil is made from syrene/acrylonitrile copolymer, e.g. about 70% by weight styrene and 30% by weight acrylonitrile copolymer. Such a copolymer is less swelled or dissolved by oil, especially the aromatic constituents of oil, than is polystyrene and so better reusable after squeezing out oil or otherwise removing absorbed oil.

Instant foam, especially at higher gas pressures, can be generated under water and used for refloating sunken ships or as a flotation device to carry objects from underwater to the surface.

The quantitative release of water/surfactant instant foam is achieved from glass containers, glass coated containers, metal cylinders or tanks, or containers with hydrophylic coatings which are wetted with water.

The thermoplastic polymers to which this invention pertains covers a wide range of compositions, and includes, but is not limited to acrylonitrile-butadiene-styrene, the acetal esins such as polyoxymethylene, and the acrylics such as poly(methacrylate), cellulose acetate, cellulose acetate butyrate, cellulose propionate, the polycarbonates, the soluble polyolefins, polyisobutylene, polybutadiene, butyl rubber, styrene-butadiene, styrene polymers and copolymers, soluble urethanes, and the vinyl polymers and copolymers including polyvinyl acetate and ethylene/vinyl acetate. The present invention has been found to be particularly useful for forms of homogeneous polymers such as polyvinyl acetate, vinyl chloride/vinyl acetate copolymers, polystyrene, styrene, α-methyl styrene, styrene-butadiene copolymers, styrene-acrylonitrile copolymers and, to non-homogeneous polymer systems, i.e. certain polyblends and grafts copolymers, such as high impact polystyrene, acrylonitrile-butadiene-styrene. In copending application Ser. No. 503,903, filed September 6, 1974 and now U.S. Pat. No. 3,959,197, in addition to polystyrene instant foam formulation, specific examples are given of polyvinyl acetate, acrylonitrile-butadiene-styrene, styrene-butadiene and styrene-acrylonitrile formulations which like the polystyrene formulations shown in this application and other thermoplastic formulations are quite suitable for use in the process of the present invention.

It has been found that any number of solvents can be used as the major solvent. It is preferable that the major solvent form a gel with the polymer to be foamed and that it boils below about 0° C. It was found that methyl ether (b.p. −24.8° C) and chloromethane (b.p. −24.1° C) were excellent solvents and gelling agents. These two solvents alone in a range of from 25 to 100% by weight of the polymer, and in combination with minor amounts of other low-boiling solvents, can be used to foam amorphous polymers, such as styrene, styrene-butadiene copolymer rubbers, or the highly polar styrene-acrylonitrile copolymers or polyvinyl acetate.

In order to improve processability of the foams produced by this invention, whether made of polystyrene or another polymer or copolymer, it is preferred to have a suitable co-solvent whose boiling point is preferably above 20° C. room temperature. The function of this second solvent is to improve processability by diffusing out of the polymer matrix into the gas space after the foam has been blown. Minor co-solvents of this type include, but are not limited to pentane (including isopentane, cyclopentane, etc.), 1,1-difluoro-1-chloroethane, dichlorofluorometane, trichlorofluoromethane, tetrachloroethylene, etc.

It was found that the proportion of minor solvent may vary from about 3 to about 3% by weight of the polymer. Although the minor solvent in the above range was satisfactory, it was found that from about 10 to about 20% by weight of the polymer produced foams having enhanced properties.

The critical role of a surfactant in the formulation was clearly shown. In the absence of a suitable surfactant and/or water the foam may be of poor quality, and have very large and uneven cells. Furthermore, the foam does not extrude as well from the pressure vessel. It was found that Igepal CO-970 nonylphenoxy-(ethyleneoxy) ethanol was quite satisfactory, although other suitable surfactants can be used in the present process.

In homogeneous polymer solutions, such as polystyrene, styrene/acrylonitrile copolymers, or polyvinyl acetate, the use of a finely divided particulate nucleating agent, such as glass microballoons, phenolic microballoons, or finely divided polyethylene, is very beneficial to the production of smaller and more uniform celled foams than obtained with surfactant alone. Of the nucleating agents tested, the glass microballoons appear to be the most generally useful. However, in non-homogeneous polymer systems, i.e. polyblends and graft copolymers such as acrylonitrile-butadiene-styrene, the use of a nucleating agent is not beneficial and may, in many instances, be disadvantageous.

The nucleating agents are solids that are readily dispersed in the gelled polymer mixture and apparently serve as centers for bubble formation resulting in uniform fine cells. Preferred are spherical polyethylene powder having a particle size range of from 4 to $40\mu$, an average particle size of less than $20\mu$, and a melt index of less than 40; glass hollow spheres having a particle size range of from 10 to $270\mu$, and an average particle size of approximately 65 microns; and phenolic hollow spheres having a maximum bulk density of 0.105 g./cc. and a particle size range of 2-60 microns. The nucleating agents are used in a range of from 1.5 to 6% by weight based on the solid foam. Somewhat better foams may be obtained at levels of about 3% by weight.

The melt index is a well-established basis for classifying polyethylene and is measured by a simple capillary rheometer as described in ASTM D 1238. See also "Melt Flow of Polyethylene", J. P. Tordella and R. E. Joley, Modern Plastics, Vol. 31, No. 2, page 146 (1953).

Additives may be incorporated in the foamable mixture in small proportions without adverse effects, e.g., plasticizers, flame retardants, dyes, fillers, etc.

In certain applications it may be desirable to supplement the vapor pressure of the foamable composition with a gas such as nitrogen or carbon dioxide. This is conveniently done by adding the supplemental gas to the already charged container, pressurizing it to any desired pressure, e.g. 80, 100 or 400 psi.

The shape and size of the foam is determined primarily by the orifice or die use. Thus, a round die produces a cylindrical foam of generally larger diameter than the die opening, e.g. a 1 inch diameter outlet may produce above a several inch diameter foam. Shapes of various cross-sections are obtained by various shaped dies, e.g. square, rectangular, etc. Foams varying from pudgy cylinders (small length to diameter ratio) to thin boardlike structures, short on long in length, are readily fabricated. Although the foam is usually discharged into air, it may also be discharged into a non-solvent liquid, e.g. water, or into a mold. The foam may be discharged incrementally (batch wise) from the pressurized vessel in which it is contained with prolonged periods of time between each release.

BRIEF DESCRIPTION OF THE DRAWINGS

The invention will be more clearly understood from the following detailed description of specific examples thereof read in conjunction with the accompanying drawings wherein.

DESCRIPTION OF THE PREFERRED EMBODIMENTS

The invention is further illustrated by, but not limited to, the following examples:

All of the following data was based on an original "standard" formulation, as given in Table 1.

Table 1

STANDARD INSTANT POLYSTYRENE FOAM FORMULATION

| Ingredient | Parts Per 100 Parts by Weight |
|---|---|
| Lustrex HH-101[1] | 62.29 |
| Microballoons[2] | 1.18 |
| Igepal CO-970[3] | 3.99 |
| Tetrachloroethylene | 2.38 |
| Methyl chloride | 30.16 |

[1]Polystyrene - Monsanto Company
[2]IG 101 - glass microballoons - Emerson & Cummings
[3]Igepal CO-970 - a nonionic detergent which is a nonylphenoxypoly(ethyleneoxy) ethanol detergent or wetting agent made by GAF Corporation Water is not present in the above formulation. Initially, all foams were prepared in 16 oz glass pressure bottles. These inexpensive pressure vessels are very useful in the study of formula variables. The bottles are transparent and the solvation process and viscosity changes can be observed. Charging an instant foam to a bottle generally follows this stepwise procedure.

1. Condense the methyl chloride. This is done by passing the gas through a dry ice cold finger condenser and collecting the condensate in a dry ice chilled flask.

2. Transfer polystyrene beads to a clean, dry, preweighed bottle.

3. Add the glass microballoons, place a stopper (cork or rubber) in the bottle, and shake to disperse the microballoons.

4. Transfer the surfactant to the bottle. If the surfactant is a liquid, it can be weighed directly into the bottle. If it is a solid it can be premixed with the microballoons and steps 3 and 4 combined.

5. Add co-solvent tetrachloroethylene or other compound.

6. In an explosion-proof hood, transfer the liquefied gas (methyl chloride or other gas) to the bottle. At first, the gas will boil off, cooling the bottole and its contents. The required amount of gas is added by weight. A slight excess is added to compensate for weight loss (by boil off) during the capping operation. Put a cap on the bottle, and allow it to warm to room temperature.

7. Dissolve the polymer. Solvation of the polystyrene is generally effected at room temperature by placing the bottles on a wheel rotating in the vertical plane. Two modes of room temperature agitation were employed: first, continuous slow rotation on a wheel; second, intermittent rotation on a wheel (e.g. 10 minutes stationary to permit drainage, followed by 15 second rotation to change position).

For difficult to dissolve polymers or very viscous solutions it is advantageous to place the charged bottles in a 50° C. oven and rotate the bottles (end for end) three times a day.

The first two methods required three days to a week for complete solvation. Using the third method, solvation could be completed in as little as 24 hours. Solvation time was markedly influenced by the nature of the formulation.

To assure complete solvation and uniformity, the elapsed time was arbitrarily set at one week for all foam solution formulations.

Figure 1:
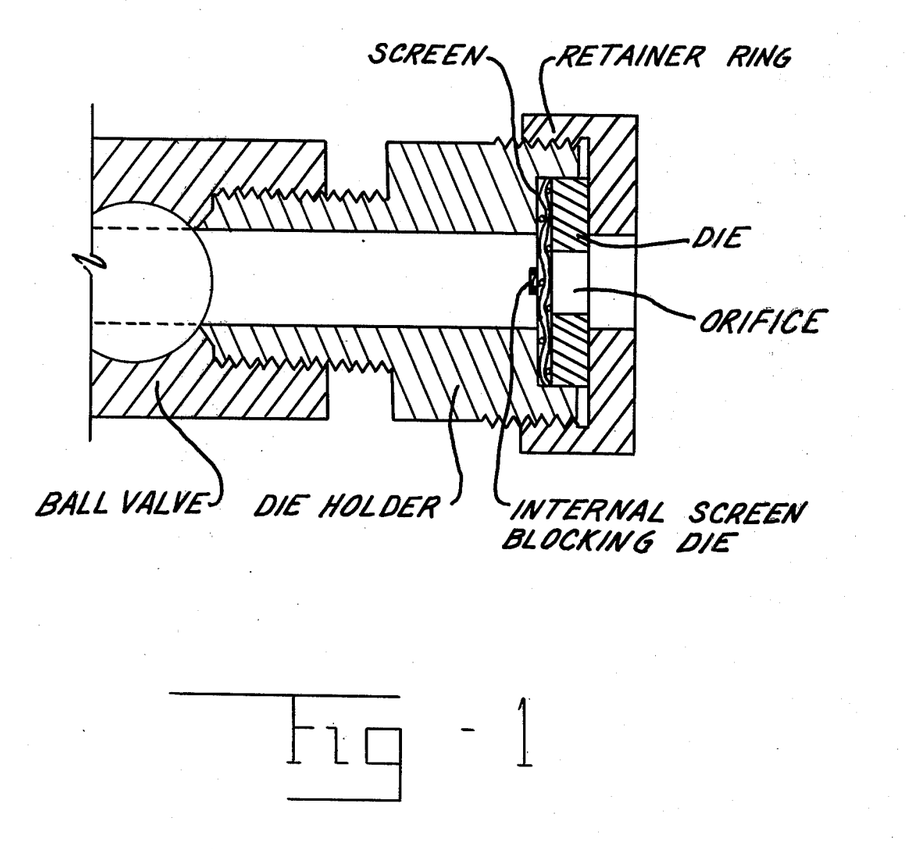
FIG. 1 is a sectional view of an extrusion die assembly together with a fast opening ball valve for releasing foamable composition from a pressure vessel including a screen with a center portion blocked. Using a die such as shown in the drawing foams are produced having a longitudinal opening through the foamed article; whereas, without the center portion blocked a solid foam article is produced.
Figure 2:
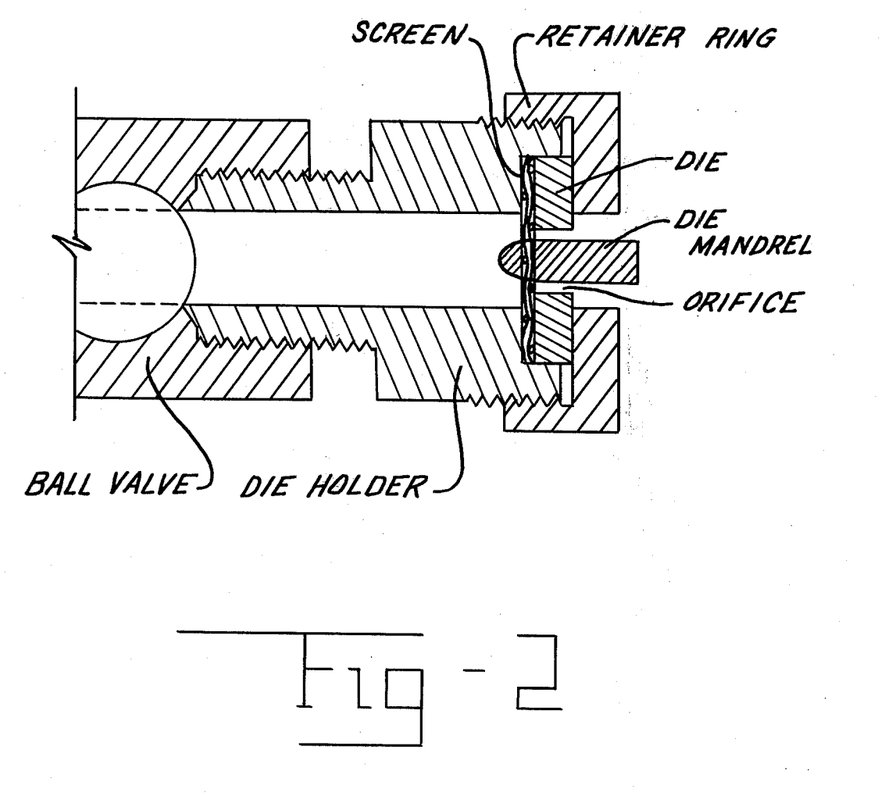
FIG. 2 is a sectional view of a die assembly similar to FIG. 1, except the center portion of the die is blocked with a cylindrical mandrel tapered on the upstream end.
Figure 3:
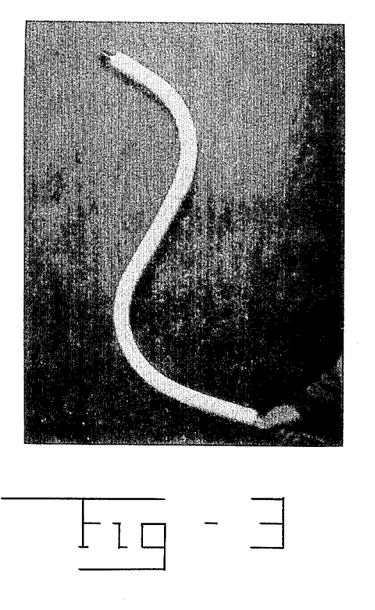
FIG. 3 is a photograph of a ½ inch pipe covered with foam insulation extruded from a die assembly similar to that shown in FIG. 2.
Figure 4:
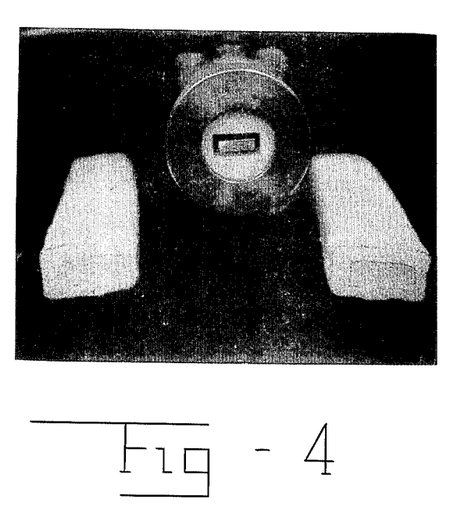
FIG. 4 shows a view of the exit end of a die assembly for extruding rectangular foam articles having a rectangular cross-section opening lengthwise through each article, together with polystyrene foam articles excluded from the die assembly.

A ½ inch thick disc of polyethylene was cut to fit a die holder such as shown in the Figure. The disc had a 9/16 in. × 1.0 in. rectangular opening in its center. A 16 mesh wire screen was positioned before the disc and a well formed rectangular foam board (1¼ in. × 2½ in.) was molded at a 12 ft. per minute flow rate. This is foam Sample No. 1 in Table 2.

To show the effectiveness of the wire screen in reducing flow and improving moldability, a Sample 2 was made using a 9/16 × 1.0 × ½ inch die without screen. The 2 inch ball valve was fully opened for only a second. The resulting foam was a cylindrical log, 5 to 5¾ inches in diameter. There was no evidence of molding or shaping.

Foam No. 3 was made using a 24 mesh, 0.015 in. diameter wire screen which had 41.1% open area. The foam, produced at a rate of 20 ft/min, was 1¼ in. thick by 2⅛ in. wide and had a rather uniform cell structure.

effect increased the density by a factor of 2.0 to almost 2.5 times that of foam made without a screen. Furthermore, the screen wire cut the partially expanded foam. This may have caused some foam collapse and also left knit lines in the foam. These lines could be seen when the foam was cut. The foams produced by extrusion through a screen had a definite fibrillar character in the direction of foam propagation. The fact that some foam collapse occurred was shown by higher foam densities. As the number of wires increases from 12 to 24, the foam density increased from 2.48 to 3.1 pcf.

The compression load properties were determined in accordance with military specification MIL-P-26514B. The compressive strength of polystyrene prepared by screen extrusion is higher than for standard polystyrene of comparable density. This fact is borne out by the 25% and 65% compressive strength measured parallel to the direction of extrusion (shown in Table 3).

An investigation was made to establish the best screen location in relation to the die. The screen or screens were positioned before and after the die, as shown in Table 4. All other test conditions were maintained as constants including the foam solution containing Igepal CO-970 and 9/16 × 1.0 × ½ inch die.

Table 2

| Sample No. | Rectangular Orifice Width-Length Depth, in. | Tank Pressure, psig | Flow Rate, ft/min | Density, pcf | Foam Description |
|---|---|---|---|---|---|
| 1 | 9/16 × 1.0 × 1/2 screen[1] | 58 | 12 | 3.6 | rectangular 1 1/4 × 2 1/4 × 36 inch |
| 2 | 9/16 × 1.0 × 1/2 no screen | 56 | very fast | <2.0 | circular 5 3/8 in. dia. × 120 in. |
| 3 | 9/16 × 1.0 × 1/2 screen[2] | 60 | 20 | — | rectangular 1 1/4 × 2 1/8 × 40 inches |

[1] Screen 16 mesh by 0.02 wire diameter with 46.2% open area located before the orifice.
[2] Screen 24 mesh by 0.015 wire diameter with 41.1% open area located before the orifice.

The early results using screens were sufficiently encouraging to warrant a more systematic study of the effect of screen size and location in the die. A number of commercial screens were purchased and tested with the 9/16 × 1.0 × ½ inch polyethylene die. The screens were positioned before the die. Table 3 lists these screens. The variations in the number of openings and wire diameter represent an 11% overall change in the percent open area for the screens tested. The foams showed only a slight change in cell structure, but, in general, cell structure improved with the higher mesh screens.

For comparison, Sample 4 was made using no screen. The cylindrical foam extruded at a rate of 216 feet per minute. The effect of the screens was to force the instant foam solution after partial expansion to take a shape by restricted flow. The compacting or restricting Sample 10, which was made with the screen located after the die, showed only slight shaping of the foam, which was more elliptical than rectangular. Sample 11 was extruded with the screen before the die. This represents the position of the screen in earlier tests. Foams prepared with the screen in this position extruded well and produced relatively high density foams. Positioning of the screen just before the die apparently causes the greatest amount of foam collapse, or compaction of the foam. This densification was possibly caused by the screen cutting the raw expanding foam into strands and the subsequent coalescence of these strands back into a slab or board. These foams, when cut perpendicular to the direction of extrusion, had the appearance of an expanded grid.

Table 3

| Sample No. | Screen[1] Mesh | Wire Dia. | Screen Open Area, % | Tank Pressure, psig | Sample Description Width-Depth-Length, in. | Density, pcf | Foam Extrusion Rate ft/min. | Compression Load, psi | | | | % Recovery after 1 Min. | Ratio Strength/Density | |
|---|---|---|---|---|---|---|---|---|---|---|---|---|---|---|
| | | | | | | | | Direct. of Test | 25% | 50% | 65% | | 25% | 65% |
| 4 | no | screen | — | 62 | Cylindrical 4-5/8 in. dia. × 18 ft. | 1.6 | 216 | parallel perpendicular | 13.5 7.3 | 15.1 10.2 | 18.6 14.0 | 49 50 | 8.4 | 11.6 |
| 5 | 12 | 0.032 | 34.2 | 60 | Rectangular 1-3/8×2-1/4 ×53 | 2.48 | 27 | parallel perpendicular | 41 26 | 42 36 | 59 52 | 43 48 | 16.4 | 23.6 |
| 6 | 14 | 0.032 | 29.8 | 62 | Rectangular 1-3/8×2-3/8 ×52 | 2.56 | 26 | parallel perpendicular | 46 27 | 49 41 | 65 60 | 44 45 | 17.7 | 25.0 |
| 7 | 16 | 0.028 | 30.5 | 62 | Rectangular 1-3/16×2-1/8 ×34 | 3.7 | 17.0 | parallel perpendicular | 44.0 27.0 | 47.0 40.0 | 67 61 | 47 47 | 12.0 | 18.0 |
| 8 | 24 | 0.015 | 41.1 | 60 | Rectangular 1-1/4×2-1/8×40 | 2.7 | 12 | parallel perpendicular | 61 28 | 59 45 | 71 69 | 45 49 | 22.6 | 26.3 |
| 9 | 24 | 0.015 | 41.1 | 68 | Rectangular | 3.1 | 16 | parallel | 97 | 107 | 147 | 50 | 31.0 | 47.3 |

Table 3-continued

| Sample No. | Screen[1] Mesh | Wire Dia. | Screen Open Area, % | Tank Pressure, psig | Sample Description Width-Depth-Length, in. | Density, pcf | Foam Extrusion Rate ft/min | Compression Load, psi Direct. of Test | 25% | 50% | 65% | % Recovery after 1 Min. | Ratio Strength/Density 25% | 65% |
|---|---|---|---|---|---|---|---|---|---|---|---|---|---|---|
| | | | | | 1-3/8×2-1/4 ×43 | | | perpendicular | 49 | 79 | 113 | 50 | | |

[1]C. E. Tyler screens, Stainless Steel Type 304, located before the orifice.
[2]9/16×1.0×1/2 inch orifice in a polyethylene die.

Table 4

| Sample No. | Screen[1] Mesh | Wire Dia. | Screen Location | Tank Pressure, psig | Sample Description Width-Depth-Length, in. | Density, pcf | Foam Extrusion Rate ft/min | Compression Load, psi Direct. of Test | 25% | 50% | 65% | % Recovery after Min. | Ratio Strength/Density 25% | 65% |
|---|---|---|---|---|---|---|---|---|---|---|---|---|---|---|
| 10 | 16 | 0.20 | after die | 70 | almost round, dia. 2.0× 2-5/8 | 3.0 | 22 | parallel perpendicular | 7.5 38 | 15 33 | 26 41 | 62 45 | 2.5 | 8.7 |
| 11 | 16 | 0.20 | before die | 70 | Rectangular 1-1/4×2-1/4×47-3/4 | 3.6 | 24 | parallel perpendicular | 39 23.1 | 38 35 | 45 51 | 43 48 | 1.1 | 12.5 |
| 12 | 16 | 0.20 | before test assembly | 70 | Rectangular 1-3/8×2-1/8 ×61 | 2.5 | 30 | parallel perpendicular | 38 8 | 33 15 | 46 26 | 44 62 | 15.2 | 18.4 |
| 13 | 16 | 0.020 | before test assembly | 70 | Rectangular 1-1/2×2-1/8×11 | 1.8 | 5.4 | parallel perpendicular | 27 7.5 | 24 13 | 26 26 | 46 56 | 15.0 | 14.4 |
| | 24 | 0.015 | before orifice | | | | | | | | | | | |
| 14 | 16 | 0.02 | before test assembly before orifice | 68 | Rectangular 1-1/8×2.0×10.5 | 2.1 | 4.9 | parallel perpendicular | 9.0 28 | 17 29 | 26 35 | 46 46 | 4.3 | 12.4 |
| 15 | 24 | 0.015 | before orifice | 66 | 1-3/8×2-5/16 ×33 | 2.9 | 16.5 | parallel perpendicular | 27 54 | 42 56 | 61 73 | 49 43 | 9.3 | 21.0 |
| 16 | 16 | 0.02 | before valve | 70 | Rectangular shape until screen blew through | | | | | | | | | |

[1]9/16×1.0×1/2 inch orifice in a polyethylene die.

Sample 12, made with the screen located just prior to the holder for the test die, was a lower density foam with greater expansion. This foams's flow rate was the highest of the samples prepared in this series. With the screen in this position the die effectively molded the foam extrudate.

Samples 13 and 14 evaluated the effect of dual screens in the foam solution stream. The first screen was located prior to the holder for the die and the second was positioned before the 9/16 × 1.0 × ½ in. die. The foam produced in Sample 13 was a well shaped rectangular piece with irregular cell structure. Because of the cell structure this run was repeated in Sample 14, and a somewhat improved cell structure was obtained. The densities of both samples remained lower than for foam samples prepared with the single screen in front of the polyethylene die. The big difference was the drop in flow rate. When the samples was cut perpendicular to the direction of extrusion no impression of the screen grid was observed.

The 16 mesh screen used in the Samples 11–14 was replaced with 24 mesh screen, placed before the 9/16 × 1.0 × ½ inch die, and Sample 15 was made. It was comparable to Sample 11 prepared with the 16 mesh screen. Again, the foam density was higher and flow rate increased to 16.5 feet per minute.

Sample 16 represents an attempt to evaluate the effect of a screen located before the 2.0 inch ball valve. The initial flow of foam indicated that such a position was feasible. However, shortly after the valve was opened, the screen was forced through the valve and into the die. The first one foot of foam through the die was molded into a rectangular section. After the screen was forced out of position a cylindrical log of foam was extruded.

The physical properties for these foams are consistent with those of earlier samples of foam prepared by extrusion through a screen. The 25% and 65% strength to density ratios are higher than one would find with a more conventional polystyrene foam. Exceptions are Samples 10 and 14 tested parallel to the direction of extrusion. Their strength to density ratios are quite low, falling below 10.

The pressure of gas varies with temperature. A study was made to determine the effects of such pressure changes on extrusion rates, density, and other foam properties. The pressure of the liquefied gas was supplemented with nitrogen to give tank pressures of 60, 70, 80, 90 and 100 psig. The foam solution contained Igepal CO-970. Extrusion was carried out through the 9/16 × 1.0 × ½ inch rectangular die. A 24 mesh by 0.015 inch diameter wire screen with 41.1% open area was used. It was mounted upstream from the die. The data for this study are presented in Table 5. Foam Sample 17 is anomalous — it was run at a different time (four days earlier) than were the other foams in the series. It had an abnormally high delivery rate which cannot be explained.

Table 5

| Sample No. | Screen[1] Location | Tank Pressure, psig | Density, pcf | Foam Extrusion Rate ft/min | Sample Description | Test Direction | Compression Load, psi | | | % Recovery After 10 min. | Ratio Strength/Density | |
|---|---|---|---|---|---|---|---|---|---|---|---|---|
| | | | | | | | 25% | 50% | 65% | | 25% | 65% |
| 17 | before orifice | 66 | 3.0 | 17.0 | Rectangle 1-3/8×5/16 | Para | 54 | 56 | 73 | 43 | 18.0 | 24.3 |
| | | | | | | Perp | 27 | 42 | 61 | 49 | | |
| 18 | before orifice | 70 | 3.10 | 9.0 | Rectangle 1.0×2.0 | Para | 63 | 59 | 79 | 44 | 20.1 | 25.2 |
| | | | | | | Perp | 24 | 43 | 67 | 44 | | |
| 19 | before orifice | 80 | 3.22 | 9.6 | Rectangle 13/16×2.0 | Para | 65 | 64 | 90 | 42 | 20.1 | 28.0 |
| | | | | | | Perp | 32 | 53 | 82 | 44 | | |
| 20 | before orifice | 90 | 3.10 | 10.2 | Rectangle 1-1/4×2-1/8 | Para | 122 | 112 | 165 | 43 | 39.3 | 53.2 |
| | | | | | | Perp | 32 | 51 | 78 | 48 | | |
| 21 | before orifice | 100 | 3.19 | 10.8 | Rectangle 1-1/4×2-1/4 | Para | 63 | 56 | 83 | 46 | 20.0 | 26.0 |
| | | | | | | Perp | 34 | 62 | 85 | 46 | | |

[1]9/16×1.0×1/2 inch orifice in a polyethylene die with a 24 mesh 0.015 inch wire screen before the orifice.

The latter four foams are comparable, having been prepared in sequence. They show an increase in flow rate with an increase in pressure. Density remains fairly constant as pressure changes, but as pressure increases, the cross-sectional areas of the foams increase. The compression loads (psi) remain essentially the same except for foam Sample 20. This sample, tested parallel to the direction of extrusion, has load bearing properties almost double those of the other foams. The results indicate a possible experimental or mathematical error in measuring the strength of this foam.

Two experiments were carried out wherein the basic formulation shown in Table 1 above was changed. In one experiment the tetrachloroethylene was eliminated from the formulation, extrusion was through a screen and a rectangular die having the center portion blocked by a square rod, a rectangular foam board having a rectangular axial passage was formed, and this foam board was of good quality. Another experiment was run with similar equipment with the tetrachloroethylene of the Table 1 formulation being replaced by Freon 11, and this foam board similar to that described in the previous sentence was of good quality.

As a result of the extrusion studies it was shown that "instant" polystyrene could be delivered at a slow, controlled rate and with a rectangular cross-section. Characteristics of the procedure involved, and the foam produced indicated the following:

A slow flow rate gave long enough dwell times in a shaping die to form the foam into useful shapes.

The flow rate and foam density can be controlled by varying the ratio of the length of the foam passage through the die to the cross-sectional area of the die opening. For circular dies it was found that flow would stop when the length to diameter ratio was between 8 and 11 to 1.

Screens or baffles in conjunction with the rectangular orifice were necessary to produce the dense rectangular cross-section foam.

Foam extruded at a controlled rate could be handled and processed downstream from the foam generator, i.e. sufficient residual solvent was left in the foam immediately after generation to permit straightening and secondary shaping of the foam.

Boards of foam could be produced that were 2.5–3.0 inches thick by 12-inches wide and of indefinite length. Length was determined by how long the valve was kept open and by the capacity of the supply tank.

The foam was rigid enough shortly after formation to be cut.

The foam had no residual tack. This permitted stacking of the foam moldings and boards.

Although the invention has been described in terms of specified embodiments which are set forth in considerable detail, it should be understood that this is by way of illustration only, and that the invention is not necessarily limited thereto, since alternative embodiments and operating techniques will become apparent to those skilled in the art in view of the disclosure. Accordingly, modifications are contemplated which can be made without departing from the spirit of the described invention.

We claim:

1. In a process for rapidly producing a substantially uniform, elongated, cellular, thermoplastic article comprising rapidly discharging from a vessel a pressurized gel of a solid thermoplastic amorphous polymer and a gaseous solvent in the range of about 25–100% by weight of said polymer, said polymer having a solubility parameter between 8.4 and 10.4 and an intrinsic viscosity value between 0.5 and 5.0, and said solvent being capable of forming a flowable gel with the polymer when subjected to super-atmospheric pressure, the improvement for shaping the article comprising restraining sufficiently the speed of flow of the gel from the vessel through the die to allow the die to shape the article, said gel being present in said vessel at a temperature in the range of about $-10°$ to $50°$ C.

2. A process of claim 1 wherein said gel contains a water-soluble surfactant in sufficient amount to promote the flow of the gel from the vessel.

3. A process of claim 1 wherein for homogeneous polymer solutions a nucleating agent is contained in said gel in sufficient amount to promote uniformity of cell size.

4. A process of claim 1 wherein a screen is placed before the die to restrain the speed of flow of the gel.

5. A process of claim 4 wherein a center portion of said screen is blocked to give a shaped article with an opening through the center thereof.

6. A process of claim 4 wherein a center portion of the screen is blocked by a tapered end of a mandrel to give a shaped article with an opening through the center thereof.

7. A process of claim 1 wherein said thermoplastic polymer is polystyrene.

8. A process of claim 1 wherein to promote processability of said article another solvent boiling above about $20°$ C is present in said gel in an amount of about 3 to 30% by weight of said polymer.

9. A process of claim 8 wherein said other solvent is tetrachloroethylene.

10. A process of claim 1 wherein said gaseous solvent boils below about $0°$ C.

11. A process of claim 1 wherein said gel contains a water-soluble surfactant in sufficient amount to promote the flow of the gel from said vessel, said gaseous solvent boils below about 0° C. and to promote processability of said article another solvent boiling above about 20° C. in an amount of about 3 to 30% by weight of said polymer.

12. A process of claim 11 wherein said other solvent is tetrachloroethylene.

13. A process of claim 12 wherein a screen is placed before the die to restrain the speed of flow of gel.

14. A process of claim 13 wherein said thermoplastic polymer is polystyrene.

* * * * *